United States Patent [19]

Ramsay

[11] 4,389,385
[45] Jun. 21, 1983

[54] PRODUCTION OF POROUS GELS AND CERAMIC MATERIALS

[75] Inventor: John D. F. Ramsay, Abingdon, England

[73] Assignee: United Kingdom Atomic Energy Authority, London, England

[21] Appl. No.: 117,766

[22] Filed: Feb. 1, 1980

Related U.S. Application Data

[63] Continuation of Ser. No. 733,151, Oct. 18, 1976, abandoned.

[30] Foreign Application Priority Data

Oct. 22, 1975 [GB] United Kingdom ............... 43463/75
Jun. 18, 1976 [GB] United Kingdom ............... 25497/76

[51] Int. Cl.$^3$ ................... C01B 33/158; C01G 25/02; C01G 23/08; C01F 7/02
[52] U.S. Cl. ................... 423/338; 210/198.2; 210/198.3; 252/451; 252/315.6; 252/315.7; 423/608; 423/610; 423/628; 252/315.01
[58] Field of Search ............... 252/317, 451; 423/338, 423/608, 610, 628; 210/198.2, 198.3

[56] References Cited

U.S. PATENT DOCUMENTS

| | | | |
|---|---|---|---|
| 2,535,948 | 12/1950 | Nicholson et al. | 252/317 X |
| 2,900,349 | 8/1959 | Schwartz | 252/317 |
| 3,086,845 | 4/1963 | Malley et al. | 252/317 X |
| 3,103,495 | 9/1963 | Wagner et al. | 252/317 |
| 4,150,101 | 4/1979 | Schmidt et al. | 252/317 X |

FOREIGN PATENT DOCUMENTS

| | | | |
|---|---|---|---|
| 713211 | 8/1954 | United Kingdom | 252/313 S |
| 1362331 | 8/1974 | United Kingdom | 210/198.2 |

*Primary Examiner*—Richard D. Lovering
*Attorney, Agent, or Firm*—William R. Hinds

[57] ABSTRACT

The invention relates to gels produced by dispersing solid primary particles of an inorganic substance in a liquid to form a sol containing colloidal particles which are aggregates of the primary particles and drying the sol to produce a porous gel.

The gels find applications in chromatography. Calcined gels give porous ceramic materials suitable for use as catalyst supports.

12 Claims, 1 Drawing Figure

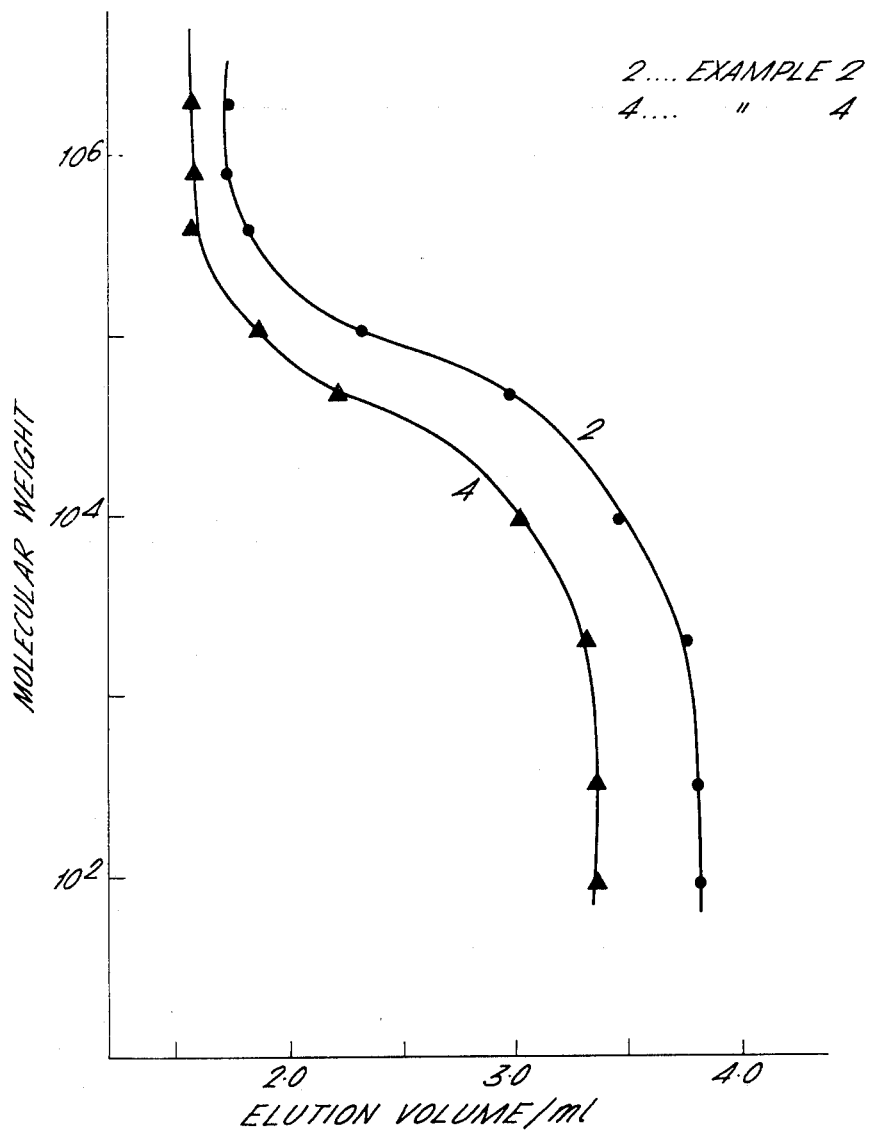

PRODUCTION OF POROUS GELS AND CERAMIC MATERIALS

This is a continuation, of application Ser. No. 733,151 filed Oct. 18, 1976, now abandoned.

The present invention relates to gels and finds application particularly but not exclusively, in connection with particulate porous materials suitable for use in chromatography and porous ceramic materials suitable for use as catalyst supports.

According to one aspect of the invention there is provided a process for the production of a porous gel of an inorganic substance which comprises dispersing solid primary particles of the substance in a liquid to form a sol containing colloidal particles which are aggregates of the primary particles and drying the sol to produce a porous gel.

Preferably the solid primary particles are substantially spherical, non-aggregated and non-hydrated prior to mixing with the liquid (e.g. water).

The upper size limit of the primary particles is governed by the sedimentation rate of the sol formed therefrom and we prefer that the primary particles are between 4 and 50 nm. in diameter.

We also prefer that the solid primary particles are those produced by a vapour phase condensation method.

Such vapour phase condensation methods can give a substance in a fine, small particle size, high surface area form suitable for dispersing in a liquid to form a sol.

By "vapour phase condensation method" we mean a method which involves a vapour phase intermediate. Examples of vapour phase condensation methods are hydrolysis of volatile halides or alkoxides (e.g. flame hydrolysis of volatile metal halides), evaporation and condensation methods using electronbeam, D.C. arc or RF plasma heating, and metal oxidation (e.g. of Mg) to give a smoke which is then condensed.

A specific example of such a method, is the flame hydrolysis of a halide to give a corresponding refractory oxide where substantially spherical primary particles are formed. Such refractory oxides are in a fine, small particle size, high surface area form and may, for example, have a particle size in the range 4–50 nm diameter and a particular example is finely divided alumina having a particle size of ~10 nm and a surface area of ~100 m$^2$/g. Alumina, silica, titania and zirconia are examples of materials which can be produced by vapour phase condensation methods in the form of primary particles suitable for use in carrying out the present invention. Thus for example sols and gels have been prepared in accordance with the present invention from commercially available flame hydrolysed silica and alumina and titania.

In addition to the materials hereinbefore mentioned it is believed that silicas which are available with organically treated, "hydrophobic" surfaces can be used in accordance with the present invention so that porous particles having a bonded organic surface phase can be produced.

A number of methods for drying the sol are applicable to the production of gels in accordance with the present invention.

Thus, for example tray drying in air at ambient temperature or removal of liquid into a partially miscible solvent (e.g. hexanol where water is the liquid) can be used to give a porous gel.

Where the porous gel is required in the form of porous gel particles we have found that it is convenient to form the sol into droplets prior to the drying step so that after drying the gel is in the form of porous gel particles. For example we have found that it is convenient to spray-dry the sol to give substantially spherical porous particles. Typically the temperature of such spray drying does not exceed 300° C.

When spray-drying is used we prefer to use a sol which is as concentrated as is consistent with a viscosity which is satisfactory for spray drying. Thus we have found that primary particle concentrations of 25–30% tend to give a paste which is unsuitable for spray drying and therefore for the production of porous gel spheres in this manner we prefer that a sol should contain about 10–15% (weight per volume) of primary particles.

We have found that gels having certain characteristics are particularly suitable for chromatography, especially exclusion chromatography (i.e. gel permeation or gel filtration chromatography).

Therefore, according to another aspect of the present invention a gel, suitable for use in exclusion chromatography, comprises a porous gel, formed from a plurality of solid primary particles of an inorganic substance, and having high porosity and pores of controlled size with a narrow pore size distribution.

Very preferably gels for use in chromatography are in the form of porous particles. For use in gel permeation chromatography under pressure (e.g. high pressure liquid chromatography (HPLC)) where high column efficiencies are required we have found that it is highly preferable for the porous gel particles to have a narrow size distribution. This may be achieved by subjecting the porous particles to a size classification process after formation.

By "narrow size distribution" we mean that 70% of all the porous gel particles are within ±10% of the mean diameter. Whilst we prefer for chromatography, particularly gel permeation chromatography, that the porous gel particles are in the size range 2–20$\mu$ in diameter, we have found that particles up to ~40$\mu$ in diameter can exhibit useful chromatographic properties.

It has been found also that useful gel permeation chromatography properties (and, depending on the column efficiencies obtainable, useful HPLC properties) can exist in porous gels having 70% of the pore volume contained within pores having a size within the range of ±25% of the mean and thus "narrow poor size distribution" in this specification means within ±25% of the mean (i.e. (x/$\sigma$)>4, where x is the mean and $\sigma$ is the standard deviation).

A preferred narrow pore size distribution for the porous gels of the present invention is that 70% of the total pore volume is contained within pores having a size <±10% of the mean. (i.e. (x/$\sigma$)>10).

Porous gels of alumina and of silica have been prepared with a pore size distribution within this preferred range.

By "high porosity" we mean that the porosity, $\epsilon$, (i.e. pore volume/total volume (pore+gel)) is $\geq$0.70.

Properties of examples of porous gel particles according to the present invention are hereinafter given in the Examples.

Higher column efficiencies than those reported under the heading "Examples 5–10" can be obtained by slurry packing columns (as opposed to dry packing) and by using small (5 to 10 $\mu$m diameter) porous gel particles. Examples 12 and 13 relate to slurry packed columns.

Whilst it has been found that chromatographic performance (in gel permeation chromatography) of porous gels prepared in accordance with the invention can be satisfactory without the need for a calcination step, said porous gels formed by drying the sol in accordance with the invention can be subjected to controlled calcination (heating) to improve their strength and/or modify their sorptive properties. Calcination (heating) can be carried out to an extent which forms a porous ceramic material from the gel.

Thus, according to a further aspect of the invention a process for the production of a porous ceramic material comprises dispersing solid primary particles of an inorganic substance in a liquid to form a sol containing colloidal particles which are aggregates of the primary particles, drying the sol to produce a porous gel and heating the gel to form a porous ceramic material.

By controlling calcination (heating) the extent of conversion of a gel to a porous ceramic material can be controlled.

Porous ceramic materials produced in accordance with the present invention find applications as catalyst supports.

The surface and porous properties and thermal stability of porous ceramic materials in accordance with the present invention are discussed in Example 14.

We have found that the pore size and specific surface area of porous gels (e.g. in the form of gel particles) produced in accordance with the present invention (and, of course, porous ceramic materials produced from such gels) is determined a priori by the size of the primary particles.

Thus, according to yet a further aspect of the invention a process for the production of a porous gel of an inorganic substance having selected pore size and specific surface area properties comprises dispersing solid primary particles of the substance in a liquid to form a sol containing colloidal particles which are aggregates of the primary particles and drying the sol to produce a porous gel, said solid primary particles being selected to be of a size appropriate for producing the selected pore size and specific surface area properties in the porous gel.

The gels produced in accordance with the immediately preceding aspect of the invention may be heated to form a porous ceramic material as hereinbefore disclosed.

We have further found that the primary particles are arranged in a uniform manner in the colloidal particles of the sol and we believe that this uniform aggregation is maintained during the drying of the sol so that uniform (narrow size distribution) pores are obtained in the gel.

We believe that the aggregation (for example in which each primary particle is in contact with four other primary particles) results in uniform pore sizes and prevents very close packing of the primary particles and the consequent loss of porosity which would result from such close packing. It is envisaged that the gels produced by drying sols in accordance with the present invention are made up of many aggregate "units" (for example in which each particle has a four-fold contact with other particles).

Relatively wide pores are required for gel permeation chromatography (~20–200 nm diameter) and it is believed that the aggregation hereinbefore described is the basis for our observation that for the production of gels for use in gel permeation chromatography no further treatment (for example hydro-thermal treatment) is necessary to enlarge the pores.

Evidence for the existence of aggregate "units" has been obtained both from light scattering and intrinsic viscosity measurements on the sols produced by dispersing flame hydrolysed powders in water. Thus silica and alumina sols (see Examples 1 and 3 hereinafter) show weight mean molecular weight values, $\overline{M}w$, two to three orders of magnitude greater than would correspond to a single primary particle. Moreover the r.m.s. radius of gyration, $<S^2>^{\frac{1}{2}}$, which gives the overall size of the aggregate, is consistent with a very openly packed structure having a large voidage. Volume fractions, $\phi$, obtained from intrinsic viscosity measurements on sols produced by dispersing flame hydrolysed powders in water provide further confirmation for 'open' colloidal aggregates. Thus in Table 1 below, the values of $\phi$ for three sols prepared from flame hydrolysed powders are compared with those from a commercially available silica sol (Syton W—Monsanto).

TABLE 1

| | Volume fractions of sols at 0.1% w/v concentration | | | |
|---|---|---|---|---|
| Sol | Alumina (flame hydrolysed) | Silica (flame hydrolysed) | Silica (flame hydrolysed) | Silica (Syton W) |
| $\phi$ | $2.3 \times 10^{-3}$ | $4.7 \times 10^{-3}$ | $4.0 \times 10^{-3}$ | $5.3 \times 10^{-4}$ |

The $\phi$ values for the sols prepared by dispersing solid primary particles in water as hereinbefore described are considerably larger than for the commercially available sol and are consistent with aggregates having a void volume of 80 to 90 percent. In contrast, the $\phi$ value for the Syton sol is in very good agreement with that expected for single isolated colloidal silica particles.

This void volume is in reasonable agreement with the porosity values, $\epsilon$, observed for the dry gels (e.g. Table 2 which appears hereinafter) and indicates that this open structure is retained when the sols are dried. Such a porosity value corresponds closely with that obtained with a regular sphere packing in which each particle has a three to four-fold contact with other particles. Further support for a similar regular packing comes both from the uniform pore size of the gels and the close relationship between the ratio of mean pore diameter and size of the primary particles.

Porous gel particles produced in accordance with the present invention may be used to achieve very good chromatographic separations (in terms of well resolved peaks) of mixtures containing various molecular weight components since the particles may be fabricated to have a narrow pore size distribution and hence sharp molecular weight exclusion limits. (Reference should be made in this context to the Examples appearing hereinafter).

Gels can be formed from sols containing more than one substance. For example, the sol may be a colloidal dispersion as disclosed in commonly owned UK application No. 43436/75 in which case the gel (and porous ceramic material is formed from the gel) can contain an additive, which may be a grain growth inhibitor (e.g. alumina with yttria as a grain growth inhibitor).

Commonly assigned UK application No. 43435/75 discloses inter alia the use of porous gels and porous ceramic materials prepared in accordance with the present invention as catalyst supports.

According to yet a further aspect, the present invention provides a gel prepared by the processes of the present invention.

The invention also provides a porous ceramic material prepared by the processes of the present invention.

The invention further provides a porous gel obtainable by dispersing solid primary particles of an inorganic substance in a liquid to form a sol containing colloidal particles which are aggregates of the primary particles and drying the sol.

Further, the invention provides a porous ceramic material obtainable by dispersing solid primary particles of an inorganic substance in a liquid to form a sol containing colloidal particles which are aggregates of the primary particles, drying the sol to form a gel and heating the gel.

The invention will now be illustrated by reference to the following examples and by reference to the single FIGURE of the accompanying drawing which is a graph showing Gel Permeation Chromatography (GPC) calibration curves (molecular weight/elution volume) for the gels produced as disclosed in Examples 2 and 4.

EXAMPLE 1

This example shows the production of a silica sol.

A commercially available flame hydrolysed silica powder, providing primary particles of silica, was added slowly to water with stirring to give a concentration of 0.2 Kg in 2 liters. Rapid stirring was continued over a period of ca. 10 minutes to effect dispersion of the primary particles, and ca. 200 ml of ammonium hydroxide solution (0.125 M) were added.

The primary particles were of 27 nm diameter and the sol had the following characteristics:

| | |
|---|---|
| Molecular weight $\overline{M}_w$ (light scattering) | $2.07 \times 10^{10}$ |
| Radius of gyration, $<S^2>^{\frac{1}{2}}$ (light scattering) | $2.9 \times 10^{-1}$ $\mu$m |
| Size of aggregates of primary particles | ca. 0.74 $\mu$m |
| Primary particles per aggregate | ca. $1.5 \times 10^3$ |

EXAMPLE 2

A sol prepared as in Example 1 was spray dried, to give spherical porous gel particles having a range of diameters. The particles were classified according to size and 20$\mu$ diameter particles selected for investigation. These selected particles had the following properties:

| | |
|---|---|
| Specific surface area | 101 m$^2$ g$^{-1}$ |
| Mean pore diameter | ca. 50 nm |
| Pore volume | 1.75 cm$^3$ g$^{-1}$ |
| Porosity, $\epsilon$ (pore volume/gel volume) | 0.80 |

The molecular weight exclusion characteristics of the porous gel particles were investigated using polystyrene molecular weight standards in tetrahydrofuran (THF) solvent.

To study these characteristics, samples of the spherical gel particles were packed in, a chromatographic column and first saturated with THF. Subsequently various polystyrene molecular weight standards were introduced into the column and the volume required to elute each standard from the column measured. The elution of the standards was monitored by means of refractive index measurements on the eluate from the column.

Referring now to the FIGURE, the molecular weight of the various polystyrene standards used is plotted against the elution volume for each standard and the curve for the particles of this Example is designated "2".

From the curve it can be seen that the molecular weight exclusion limit for the silica particles of Example 2 (as measured by polystyrene ) is $\sim 2 \times 10^5$ (i.e. the molecular weight corresponding to the region of the curve where the first vertical portion begins to transform into the horizontal plateau portion).

The sharp transition of the curve from vertical to horizontal indicates that the particles have a narrow pore size distribution and hence sharp molecular weight exclusion characteristics. The curve also provides further information; thus the length of the plateau (i.e. the horizontal portion of the curve between the two vertical portions) is dependent upon the sorptive capacity of particles.

EXAMPLE 3

This Example shows the production of an alumina sol.

0.4 Kg of a commercially available flame hydrolysed alumina powder, providing primary particles of alumina, were added slowly with stirring to 4 liters of water, to give a stable sol.

The primary particles were of 15 nm diameter and the sol had the following characteristics:

| | |
|---|---|
| Molecular weight $\overline{M}_w$ (light scattering) | $9.77 \times 10^8$ |
| Radius of gyration, $<S^2>^{\frac{1}{2}}$ (light scattering) | $1.4 \times 10^{-1}$ $\mu$m |
| Size of aggregates of primary particles | ca. 0.36 $\mu$m |
| Primary particles per aggregate | ca. $2.6 \times 10^2$ |

EXAMPLE 4

A sol prepred as in Example 3 was spray dried to give spherical gel particles having a range of diameters. Particles of 20$\mu$ diameters were selected and investigated as in Example 2 and were found to have the following properties:

| | |
|---|---|
| Specific surface area | 117 m$^2$ g$^{-1}$ |
| Mean pore diameter | 26 nm |
| Pore volume | 0.70 cm$^3$ g$^{-1}$ |
| Porosity, $\epsilon$ (pore volume/gel volume) | 0.72 |

The molecular weight exclusion characteristics of the particles produced in this Example were investigated in a manner similar to that hereinbefore described in Example 2 and, referring again to the drawing, the results obtained were plotted to give the curve designated as "4" in the FIGURE.

From this curve it can be seen that the molecular weight exclusion limit for the alumina particles of Example 4 is (as measured by polystyrene) $\sim 8 \times 10^4$. Comparing curves "2" and "4" in the FIGURE it will be seen that the silica particles of Example 2 have larger pores than the alumina particles of Example 4.

EXAMPLES 5-10

Table 2 gives properties of porous gel particles prepared in accordance with the present invention.

Examples 5 to 9 are silica gels and Example 10 is an alumina gel. (Data was obtained from nitrogen adsorption data except where indicated).

TABLE 2

| Porous Gel | Silica Gels | | | | | Alumina gel |
|---|---|---|---|---|---|---|
| | Example 5 | Example 6 | Example 7 | Example 8 | Example 9 | Example 10 |
| Specific surface area, $S_{BET}/m^2 g^{-1}$ | 61 | 101 | 167 | 260 | 258 | 117 |
| Total pore volume, $V_p/m^3 Kg^{-1} \times 10^{-3}$ | ca 1.4* | 1.76 | 1.67 | 1.69 | 1.55 | 0.70 |
| Mean pore diameter, $\bar{d}_p/nm$ | ca 120* | 60 | 42 | 33 | 28 | 29 |
| Porosity, | 0.76 | 0.79 | 0.78 | 0.79 | 0.77 | 0.70 |

*Derived from adsorption isotherm of neopentane at 273K

The Examples 5–8 (silica gels) illustrate the influence of primary particle size on the properties of the gel.

Thus, the porous gel particles of Examples 5–8 were respectively produced from sols prepared by dispersing in water silica powders (produced by flame hydrolysis) having particle diameters (in nm) of 40, 16, 12 and 7. Comparing the data given for Examples 5–8 in Table 2, it will be seen that mean pore diameter, $\bar{d}_p$, increases (28 to 120 nm) as the primary particle size of the starting sol increases (7 to 40 nm), whilst the specific surface areas decrease (260–61 $m^2g^{-1}$).

The pore size distributions of the gels of Examples 5–10 were narrow, 70% of the pores being within ±10% of the mean pore size.

The gel permeation characteristics of the porous gel particles of Examples 5–10 were investigated using molecular weight standards comprising toluene, tetraphenylethylene and a range of nine polystyrene standards (ex-Waters Associates) ($\bar{M}_w$ from $6.00 \times 10^2$ to $1.987 \times 10^6$).

The investigations were conducted using dry packed powders in stainless steel columns (0.47 m × 3.0 mm ID) and a modular liquid chromatograph (Applied Research Laboratories, LC 750) having a constant pressure pump ($\geq 9.3$ $MN_m{}^{-2}$) and ultra-violet detector. Solute concentrations were ~0.1% (w/v) for toluene and polystyrenes and ~0.01% (w/v) for tetraphenylethylene. Syringe injection was employed, using tetrahydrofuran (THF) as the mobile solvent phase, at flow rates of ~0.5 $cm^3$ $min^{-1}$.

A graph of log $\bar{M}_w$ against retention volume ($V_R$) was used to determine the molecular exclusion properties of the gels (Examples 5–10).

The Selective Permeability Ranges for the gels of Examples 5 to 10 were derived from the foregoing molecular weight investigations and are given in Table 3.

TABLE 3

| Gel | Selective Permeability Range, $\bar{M}_w$ |
|---|---|
| Example 5 | $6 \times 10^4$–$3 \times 10^6$ |
| Example 6 | $2 \times 10^4$–$8 \times 10^5$ |
| Example 7 | $1 \times 10^4$–$3 \times 10^5$ |
| Example 8 | $8 \times 10^3$–$2 \times 10^5$ |
| Example 9 | $3 \times 10^2$–$1.5 \times 10^5$ |
| Example 10 | $1 \times 10^3$–$4 \times 10^5$ |

(It will be understood that the upper values refer to total exclusion limits and that below the lower values no significant molecular weight selectivity is exhibited). Table 3 also shows a progressive exclusion towards lower $\bar{M}_w$ as the mean pore diameter, $\bar{d}_p$, is decreased from Example 5 in Example 8 (see Table 2 for $\bar{d}_p$ values).

The accessible pore volume of all the gels was high (ca. 1.7 $cm^3g^{-1}$); this was shown by the large elution volume corresponding to selective permeation ($V_O - V_i$)—where $V_O$ and $V_T$ refer to the elution volumes corresponding to the exclusion and total permeation limits of the form of the FIGURE of the accompanying drawing.

The critical size parameter for globular proteins, which are often separated by exclusion chromatography, is the hydrodynamic diameter $D_h$, which is related to molecular weight by:

$$D_h = 0.10 \times M^{0.375}$$

From this it can be inferred that separations of proteins with a molecular weight up to ~$10^8$ should be possible using the gel of Example 5 in conjunction with other gels of smaller pore size.

HPLC column efficiencies were investigated and, for example, for the porous gel particles of silica of Example 6 (which had a particle diameter (d) of ~20$\mu$ and a narrow particle size distribution (70% of all of particles within ±10% of mean size)) it was found that HETP=0.5 mm, reduced plate height (h)—25 and reduced velocity ($\nu$)=13. [It is to be appreciated that column efficiencies are expressed in terms of the height equivalent to a theoretical plate (HETP) where $$HETP = l \, (W/4V_R)^2$$

where

W=distance between the baseline intercepts of lines drawn tangent to points of the chromatogram and l=column length Also "reduced plate height" (h)=HETP particle diameter (d)

and "reduced velocity" ($\nu$)=(dv/D)

where v=linear velocity of mobile phase (2.5 mm $sec^{-1}$ in investigation hereinbefore mentioned)

and

D=diffusion coefficient of toluene in THF $3.8 \times 10^{-9}$ $m^2$ $sec^{-1}$ at 298K)]

This column efficiency demonstrates the suitability of the porous gel particles for HPLC.

EXAMPLE 11

A titania sol was prepared by dispersing a commercially available flame hydrolysed titania powder (2 Kg) in water (10 l) to which was added 2 l of $NH_4OH$ solution (1 M).

The sol was spray-dried to give porous gel microspheres (dia ~ 10 to 40 μm) having the following properties:

| | |
|---|---|
| Specific surface area ($S_{BET}/m^2g^{-1}$) | 54 |
| Total pore volume ($V_p/cm^3g^{-1}$) | 0.43 |
| Mean pore diameter ($d_p/nm$) | 34 |

EXAMPLE 12

A chromatographic column of a silica gel (that of Example 5) was prepared using the known technique of slurry packing.

In chromatographic tests similar to those discussed hereinbefore in Examples 5–10 the slurry packed column gave a HETP of 0.12 mm (d ~ 10 μm and h ~ 10)

EXAMPLE 13

A 10 cm column (5 mm ID) was slurry packed with a silica gel (that of Example 8) and gave 4500 plates for the separation of nitrobenzene (in hexane + 1% acetonitrite as solvent) at a flow rate of ca 0.8 ml min$^{-1}$, viz. HETP of 22 μm, d ~ 7 μm; h ~ 3.1 and V ~ 1.4 mm sec$^{-1}$. Where d is particle diameter, h is reduced plate height and V is linear velocity of the mobile phase.

EXAMPLE 14

An alumina gel was prepared by dispersing a flame hydrolysed alumina powder in water and tray drying the resulting sol to give a gel.

The gel was subsequently calcined (heated) in air for 2 hours at different temperatures. The surface and porous properties of the resulting material are summarised in the following table:

TABLE 3

| Calcination Temperature (°C.) | Specific Surface area ($S_{BET}/m^2g^{-1}$) | Total pore Volume ($V_p/dm^3kg^{-1}$) |
|---|---|---|
| Uncalcined | 101 | 0.77 |
| 800 | 89 | 0.81 |
| 1000 | 93 | 0.78 |
| 1100 | 74 | 0.66 |
| 1150 | ca 10 | — |
| 1200 | <<10 | — |

Thus, the porous ceramic material produced by heating the alumina gel demonstrated good thermal stability and resistance to sintering at 1100° C. Accordingly it is believed that the porous ceramic materials produced by the present invention have properties which make them particularly suitable for use as catalyst supports.

It is thought the delay in the onset of sintering as temperatures are increased is due to the highly porous and open structure of the gel as hereinbefore discussed.

I claim:

1. A process for the production of a porous gel of an inorganic substance without hydrothermal treatment to enlarge the pores, which comprises adding solid primary particles of the substance, produced by a vapor phase condensation method, to a quantity of liquid sufficient to form a sol, and dispersing the solid primary particles therein to form a sol containing colloidal particles which are aggregates of the primary particles, and drying the sol to produce a porous gel having a porosity of at least 0.70 and with 70 percent of the pore volume contained within pores having a size in the range of ±25 percent of the mean.

2. A process as claimed in claim 1 wherein the solid primary particles are substantially spherical, non-aggregated and non-hydrated prior to mixing with the liquid.

3. A process as claimed in claim 1 wherein the solid primary particles are those produced by flame hydrolysis of a metal halide.

4. A process as claimed in claim 1 wherein the particle size of the solid primary particle is in the size range 4–50 nm.

5. A process as claimed in claim 1 wherein the solid primary particles are of alumina, or of silica, or of titania, or of zirconia.

6. A process as claimed in claim 1 wherein the solid primary particles are of a refractory oxide.

7. A process as claimed in claim 1 wherein the sol is dried in the form of droplets thereby to give porous gel particles after drying.

8. A process as claimed in claim 7 wherein the sol is dried by spray drying.

9. A process as claimed in claim 7 wherein the porous gel particles are subjected to a size classification process after formation.

10. A process as claimed in claim 1 wherein the sol contains less than about 25 percent (weight per volume) of primary particles.

11. A process for the production of a porous ceramic material comprising adding solid primary particles of an inorganic substance, produced by a vapor phase condensation method, to a quantity of liquid sufficient to form a sol and dispersing the solid primary particles therein to form a sol containing colloidal particles which are aggregates of the primary particles, drying the sol to produce a porous gel without hydrothermal treatment to enlarge the pores, the gel having a porosity of at least 0.70, and with 70 percent of the pore volume contained within pores having a size in the range of ±25 percent of the mean, and heating the gel to form a porous ceramic material.

12. A process for the production of a porous gel of an inorganic substance having selected pore size and specific surface area properties without hydrothermal treatment to enlarge the pores, comprising adding solid primary particles of the substance, produced by a vapor phase condensation method, to a quantity of liquid sufficient to form a sol and dispersing the solid primary particles therein to form a sol containing colloidal particles which are aggregates of the primary particles, and drying the sol to produce a porous gel having a porosity of at least 0.70 and with 70 percent of the pore volume contained within pores having a size in the range of ±25 percent of the mean, said solid primary particles being selected to be of a size appropriate for producing the selected pore size and specific surface area properties in the porous gel.

* * * * *